Feb. 21, 1967 J. G. LEIMBACH ET AL Re. 26,161
THERMOSTATIC EXPANSION VALVE WITH AN AUXILIARY PORT
Original Filed Aug. 27, 1963
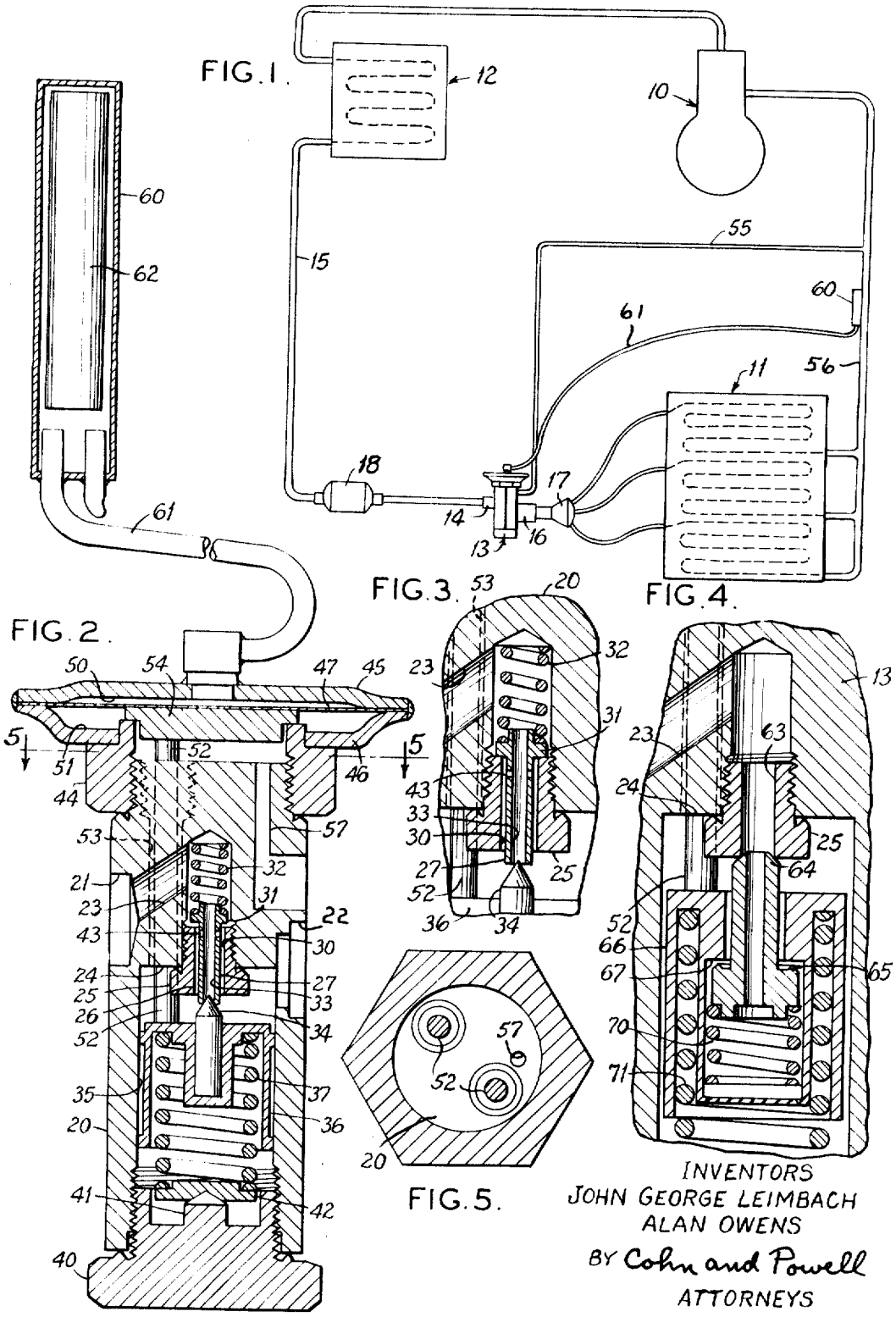
INVENTORS
JOHN GEORGE LEIMBACH
ALAN OWENS
BY Cohn and Powell
ATTORNEYS United States Patent Office Re. 26,161
Reissued Feb. 21, 1967

26,161
THERMOSTATIC EXPANSION VALVE WITH AN AUXILIARY PORT

John George Leimbach, Crestwood, and Alan Owens, Ballwin, Mo., assignors to Sporlan Valve Company, St. Louis, Mo., a corporation of Missouri Original No. 3,252,297, dated May 24, 1966, Ser. No. 304,936, Aug. 27, 1963. Application for reissue Sept. 19, 1966, Ser. No. 589,156
12 Claims. (Cl. 62—225)

Matter enclosed in heavy brackets [ ] appears in the original patent but forms no part of this reissue specification; matter printed in italics indicates the additions made by reissue.

This invention relates generally to improvements in a thermostatic expansion valve with an auxiliary port, and more particularly to improvements in a device of this type adapted to equalize very rapidly the pressures on the high and low pressure sides of a refrigeration system.

The invention is directed to a thermostatic expansion valve and its application in a refrigeration system wherein the pressures on the suction and discharge sides of the compressor must be equalized when the compressor stops. Pressure equalization is necessary when a motor with a low starting torque is used to drive the refrigerant compressor. Unless such equalization is accomplished, the pressure difference existing between the discharge and suction sides of the compressor requires that considerable starting torque be employed to restart the compressor motor. Single phase motors, commonly used in refrigeration cycle, hermetic motor-compressors can be externally wired in such a manner that they will have either a low or a high starting torque. If a starting capacitor and a relay are wired into the circuit, a high starting torque is achieved. The relay operates to remove the capacitor from the circuit after starting is accomplished. This type of wiring results in what is commonly called a capacitor-start and run (CSR) motor.

Elimination of the starting capacitor and relay results in a motor with a very low starting torque. This type of wiring results in what is commonly referred to as a permanent split capacitor (PSC) motor. Obviously, it is desirable for the manufacturer of refrigeration or air conditioning equipment, wherever possible, to eliminate the starting capacitor and relay to save the initial cost and complexity of electrical controls. Another type of low starting torque motor is the split phase motor. It is generally limited to fractional horsepower motors in refrigeration application.

Low starting torque motors of the PSC type have been used for many years in refrigeration systems where suction and discharge pressures are equalized when the compressor is stopped. Such equalization of pressure is automatically accomplished when capillary tubes are used to control the refrigerant flow between the high and low pressure sides of the refrigeration system. When thermostatic expansion valves are utilized on a system with a low starting torque motor, it has been necessary to modify the valve to prevent it from closing tightly during the "off" cycle. This has been accomplished by building in a permanent leak in the valve structure.

A problem which arises with a thermostatic expansion valve having a built-in leak, or bleed as it is commonly called, is the length of time required to equalize the pressures on the high and low pressure sides of the system. The maximum size, and hence flow rate, of the permanent leak in the expansion valve is limited by the minimum flow rate required during the operating or "on" cycle of the system. The size of the built-in leak varies from one design to another, but generally the permanent leak has been limited to less than 50% of the valve's normal capacity. This leakage rate has required that the refrigeration system be shut down for a considerable length of time, as for example from three to eight minutes, to allow the pressures in the system to equalize. This is undesirable and has required that time delay devices be used to keep the system "off" until equalization is accomplished.

It is an important purpose of this invention to provide a thermostatic expansion valve that functions normally during the operating cycle, and which opens a secondary or by-pass port whenever the motor-compressor stops. Because the secondary port is closed during normal operation of the system, it is not limited in capacity as is the leakage port in a valve with a built-in permanent leak. Therefore, the by-pass or auxiliary port can be less than, equal or to even slightly greater in capacity than the main valve port which achieves much faster pressure equalization and eliminates the need for expensive time delay devices.

*The major problem involved in designing a thermostatic expansion valve with a by-pass port, operated by the action of the diaphragm and opened on the off cycle, is closing the by-pass port when the system is started, if the by-pass port is large enough to feed the evaporator and satisfy the existing load. When such a by-pass port is used, there is a tendency for the by-pass port to feed sufficient refrigerant on start up to satisfy the load, and keep the superheat low enough that the pressure under the diaphragm is not reduced sufficiently below the pressure above the diaphragm to allow the by-pass port to close.* Another important purpose of this invention is to provide a workable device which will open a by-pass port when the system is shut down, and yet will close that port when the system starts even though the by-pass port has sufficient capacity to feed the evaporator at full load conditions.

An important object is realized by the provision of an expansion valve having a flexible motor element adapted to actuate a main valve in response to differences in pressure exerted on opposite sides of the motor element, one side being subjected to a pressure that is a function of the temperature of the refrigerant at the evaporator outlet and the other side subjected to evaporator pressure. The valve body includes a main valve port the flow through which is controlled by a main valve, and a by-pass port the flow through which is controlled by the action of the main valve.

Yet another important object is achieved by the fact that the by-pass port can be equal to or slightly greater in capacity than the main valve port so that a rapid equalization of pressures is obtained when the compressor is stopped.

An important objective is afforded by a structural arrangement in which the main valve and the by-pass valve move together to cause the by-pass valve to close the by-pass port and subsequently the main valve moves to open the main valve port upon reduction of evaporator pressure when the compressor is started, and in which the main valve moves to close the main valve port and subsequently moves together with the by-pass valve so that the by-pass valve opens the by-pass port upon increase of evaporator pressure when the compressor is stopped.

Another important objective is provided by the structural arrangement of the expansion valve in which the passage interconnecting the valve inlet and outlet includes an aperture through which a tubular by-pass valve extends to form an external peripheral by-pass port and an internal main valve port, the main valve controlling the flow through the main valve port provided in the by-pass valve, and the by-pass valve controlling flow through the by-pass port.

Still another important object is achieved by the provision of a bleed hole in the tubular by-pass valve which interconnects the main valve port and by-pass port to assure a more rapid rise in evaporator pressure when the compressor stops.

An important objective is achieved by the unique juxtaposition of the by-pass valve and main valve mentioned previously in which the by-pass valve includes a head located on the high side of the valve aperture for opening or closing the by-pass port, while the main valve is located on the low side of the valve aperture for opening or closing the main valve port through the by-pass valve, the direction of flow tending to close the by-pass valve and to open the main valve.

Another important object is to provide a thermostatic expansion valve that is simple and durable in construction, economical to manufacture and assemble, highly efficient in operation, and which operates automatically in a refrigeration cycle to afford rapid equalization of pressures during the "off" cycle.

The foregoing and numerous other objects and advantages of the invention will more clearly appear from the following detailed description of a preferred embodiment, particularly when considered in connection with the accompanying drawings, in which:

FIG. 1 is a diagram showing the refrigeration system and the connection of the expansion valve in such system;

FIG. 2 is a cross sectional view of one form of the expansion valve, showing the disposition of the component parts during the "off" cycle;

FIG. 3 is an enlarged, fragmentary cross-sectional view showing the disposition of the component parts of the valve of FIG. 2 during the "on" cycle;

FIG. 4 is an enlarged, fragmentary cross sectional view of another form of expansion valve, and FIG. 5 is a cross-sectional view as seen along line 5—5 of FIG. 2.

Referring now by characters of reference to the drawing, and first to FIG. 1, the expansion valve disclosed in detail in FIG. 2 is utilized in a refrigeration system consisting of a compressor-motor unit generally indicated at 10, an evaporator referred to at 11, and a condenser indicated at 12. The expansion valve generally indicated at 13 (FIG. 1) is connected in the refrigerant line between the evaporator 11 and condenser 12. More particularly, the valve fitting inlet 14 is connected to the line 15 leading from the condenser 12, while the valve outlet fitting 16 is connected to the distributor 17 leading to the evaporator 11. As is usual, a filter-dryer device 18 is connected in the line 15 ahead of the expansion valve 13.

The expansion valve 13 includes a valve body 20 having a valve inlet 21 and a valve outlet 22 interconnected by a refrigerant passage 23. Formed internally of valve body 20 is a partition 24 through which the passage 23 extends. Threadedly connected to the partition 24 in the passage 23 is a threaded, tubular fitting 25, the fitting 25 providing a valve aperture 26 therethrough constituting a part of the passage 23.

Extending through the valve aperture 26 is an elongate, tubular by-pass valve 27. It will be noted that the by-pass valve 27 is of a lesser diameter than the diameter of the valve aperture 26 so as to provide an external peripheral by-pass port 30 interconnecting the high side of the valve with the low side. The by-pass valve 27 includes an enlarged head 31 at its upper end adapted to seat on the top of the fitting 25 and hence adapted to open or close the by-pass port 30. A compression spring 32 is located within the passage 23, the spring 32 engaging the head 31 of the by-pass valve 27 and tending to urge the by-pass valve 27 in a direction to close the by-pass port 30. As will appear upon later description of parts, when the by-pass port 30 is open, a rapid equalization of pressures between the high and low sides of the valve will occur.

The tubular by-pass valve 27 includes the main valve port 33, the lower end of the by-pass valve 27 extending downwardly below the fitting 25 and into the low pressure side of the valve so as to be engaged by a main valve 34 that is movably mounted to open and close the main valve port 33 formed in the by-pass valve 27.

Slidably and reciprocatively mounted in a cylindrical bore 35 formed in the valve body 20 on the low side of the valve aperture 26, is a valve carrier 36. The main valve 34 fits within and projects above the carrier 36, the main valve 34 being movable with the carrier 36. A compression spring 37 engages the carrier 36 and tends to urge the main valve 34 in a direction to close the main valve port 33.

The lower end of the valve body 20 through which the bore 35 is formed, is closed by a threadedly adjustable cap 40. The innermost side of the nut 40 is provided with a post 41 on which a bearing plate 42 pivotally seats. One end of the compression spring 37 abuts the bearing plate 42. As will be apparent, the compressive force of spring 37 may be selectively varied to a predetermined value merely by controlling the thickness of the bearing plate 42.

In order to provide for a more rapid increase in evaporator pressure when the compressor stops, the by-pass valve 27 is provided with a small bleed hole 43 drilled through the wall to interconnect the by-pass port 30 and the main valve port 43. This small bleed hole 43 is insignificant during operation of the expansion valve because its capacity is only 10% to 15% of the expansion valve's nominal capacity, yet serves the purpose of assuring a more rapid rise in evaporator pressure.

Attached to the upepr end of valve body 20 by a threaded collar 44, are a pair of housing plates 45 and 46 that are spaced to provide a pressure chamber therebetween. A flexible diaphragm 47 constituting a flexible motor element is fixed between the peripheral margins of plates 45 and 46 and extends across the pressure chamber to divide the chamber into separate compartments 50 and 51. A bellows can be utilized in lieu of diaphragm 47 if desired.

A pair of push rods 52 are slidably received in bores 53 formed in valve body 20. One end of each rod 52 engages a buffer plate 54 pressed against the underside of diaphragm 47, while the opposite end of each rod 52 engages the uppermost face of the main valve carrier 36. The rod bores 53 may be of a slightly larger dimension than diameter of the rods 52 to provide a passage that communicates the valve outlet 22 with the chamber compartment 51. Thus it is seen that one side of the diaphragm 47 is subjected to evaporator pressure. Alternatively, the rods 52 may have a close fit in the bores 53, and an external equalizer line 55 may be utilized to connect the suction line 56 with an internal separate passage 57 formed in the valve body and communicating with the pressure compartment 51.

A thermal-sensing bulb 60 is connected by tubing 61 to the top of the housing plate 45, the tubing 61 placing the bulb 60 in direct communication with the pressure compartment 50 on the upper side of the flexible diaphragm 47. As is conventional, the bulb 60 is gas charged and is located in thermo-responsive relation to the suction line 56 at the outlet of the evaporator 11. With this structure, the pressure chamber 50 and the upper side of the diaphragm 47 is subjected to a pressure that is a function of the temperature of the refrigerant flow at the evaporator outlet.

Located within the bulb 60 is a thermal ballast 62 that creates a thermal lag in the increase of the temperature of the gas charge, and causes the pressure exerted on the diaphragm 47 in the chamber 50 to increase at a slower rate than the increase of evaporator pressure upon stopping the compressor. The thermal ballast 62 and its use in a sensing bulb 60 is fully disclosed in U.S. Patent No. Re. 23,706 issued September 1, 1953, to H. T. Lange and owned by the assignee of the present application.

It is thought that the operation and functional advantages of the expansion valve and its function in a refrigeration system have become fully apparent from the foregoing detailed description of parts, but for completeness of disclosure, such operation will be briefly described with reference to a particular refrigeration system and operating conditions used fully for the purpose of illustration and example.

It will be assumed that the expansion valve 13 is connected in the refrigeration system as described previously and as shown in FIG. 1, with the sensing bulb 60 located in thermo-responsive relation to the evaporator outlet. Furthermore, for the purpose of illustration, it will be assumed that this is an air-conditioning system utilizing Refrigerant-22 (monochlorotrifluoro-methane). A normal pressure that might exist during operation on the high pressure side between the discharge of the compressor 10 and the inlet 21 to the thermostatic expansion valve 13 would be 285 p.s.i.g. The normal pressure in the low pressure side or evaporator 11 during operation would be about 70 p.s.i.g. It is seen that when the compressor 10 first stops and the system is in the "off" cycle, there is a pressure difference across the compressor 10 of about 215 p.s.i.g. In order for equalization of these high and low pressures to occur, the expansion valve 13 operates to close the main valve port 33 and open the by-pass port 30, which allows the high pressure refrigerant in the condenser 12 to flow into the evaporator 11. This refrigerant flow continues until the pressure is equalized, at which time the motor-compressor 10 can re-start even though it has a low starting torque.

To describe the operation which is based on pressures of a volatile refrigerant, certain conditions of temperature must be assumed. These assumptions are for the purpose of illustration only and it should be understood that the valve 13 functions over a wide range of pressures and temperatures.

EXAMPLE

The air conditioning system uses Refrigerant-22.

| | |
|---|---|
| Compressor discharge pressure | 285 p.s.i.g. |
| Evaporator pressure | 70 p.s.i.g. |
| Evaporator temperature | 40° F. |
| Air temperature over evaporator coil | 80° F. D.B./ 67° F. W.B. |
| Temperature of suction line at valve bulb | 50° F. |

Before the compressor 10 is started, the evaporator 11 is at a temperature of 80° F. and the pressure in the entire system is at the saturation pressure of 145 p.s.i.g. equivalent to this temperature. This saturation pressure is exerted on the underside of diaphragm 47 as is seen in FIG. 2. The pressure in the valve bulb 60, which is gas charged, is at 120 p.s.i.g. at 80° F. (by design) and is the pressure exerted on the top of the diaphragm 47. The force exerted by the spring 37 is approximately 22 pounds and is sufficient to overcome the less force of approximately 5 pounds of spring 32.

Because the resultant pressure on the underside of the diaphragm 47 is higher than that on the top side of such diaphragm, the diaphragm 47 is located in or flexed to the extreme top position. The motion of diaphragm 47 is transmitted to carrier 36 by the push rods 52. Therefore, with the diaphragm 47 in the top position, the spring 37 forces the main valve carrier 36 up so that the main valve 34 closes the main valve port 33. Also in this position of the diaphragm 47, the main valve 34 raises the by-pass valve 26 and compresses the weaker spring 32 so that the by-pass port 30 is open. This arrangement and position of the component parts are shown in FIG. 2.

When the compressor 10 is started, the pressure in the evaporator 11 drops rapidly. This pressure decrease in the evaporator 11 occurs rapidly because the compressor 10 has a large capacity at the start because of the low discharge pressure. In addition, at start-up there is little liquid in the condenser 12 so that there is a time delay before liquid refrigerant starts flowing through the expansion valve 13.

The pressure in the sensing bulb 60 decreases rather slowly on start-up, partly because of the thermal ballast 62 but mainly because of the fact that there is an appreciable time delay before the suction line 56 at the bulb 60 becomes chilled. This occurs because at start-up with a low discharge pressure and a refrigerant liquid-vapor mixture entering the by-pass port 30, the by-pass port 30 underfeeds the evaporator 11 even though the by-pass port 30 may be of sufficient size to feed the evaporator 11 during normal operation. Because the evaporator 11 is underfed at start-up, the suction pressure drops rapidly and the vapor flow at the bulb 60 is highly superheated. Therefore, the bulb pressure remains high while the evaporator pressure drops. This situation lasts long enough for the by-pass port 30 to [open] *close*.

In this example, it will be assumed that the valve diaphragm 47 has an area of 1.5 square inches. As soon as the condition exists where the pressure exerted on the underside of the diaphragm 47 is 11.3 p.s.i. lower than that exerted on the top side, diaphragm 47 exerts a 17 pound force on the pin carrier 36 which is sufficient [to close the by-pass port 30] *to move the main valve 34 to a position so that the small return spring 32 closes the by-pass port 30. The return spring 32 will close the by-pass port 30 even though the by-pass port 30 may be of sufficient size to feed the evaporator 11.* As the pressure in the evaporator 11 continues ot drop, the main valve carrier 36 will continue to drop so that the main valve 34 opens the main valve port 33 as is shown in FIG. 2. The valve 13 is now in its normal operating position and performs as a standard thermostatic expansion valve.

During normal operations, the pressure in the evaporator is 70 p.s.i.g. and the pressure in the bulb is 85 p.s.i.g. (saturation pressure equivalent to 50° F.).

As soon as the cooling load is satisfied, the compressor 10 stops and the evaporator pressure rises rapidly. In an air conditioning system utilizing Refrigerant-22, there is a characteristic very rapid increase in evaporator pressure of 15 to 20 p.s.i. when the compressor 10 stops. This increase occurs within two or three seconds. After this initial increase, the evaporator pressure continues to rise, but more slowly.

Because the action of valve 13 is dependent on a rapid pressure rise in the evaporator 11, the leakage of the refrigerant through the small bleed hole 43 assures a more rapid rise in the evaporator pressure when the compressor 10 stops. This leakage is insignificant during operation of the valve 13 because the capacity of the bleed hole 43 is only 10% to 15% of the expansion valve's 13 nominal capacity.

The pressure in the sensing bulb 60 rises slowly after the compressor 10 stops because of the thermal ballast 62 in the bulb 60. Therefore, seconds after the compressor 10 stops, the evaporator pressure approaches the pressure in the bulb 60 at which time the stronger spring 37 raises the main valve 34 to a position so that it closes the main valve port 33, and raises the by-pass valve 27 by the upward movement of the main valve 34 in order to open the by-pass port 30. Once the by-pass port 30 is open, the pressures in the condenser 12 and evaporator 11 equalize rapidly, as for example, within one to two minutes.

During the equalization period, the pressure in the evaporator 11 rises to about 140 p.s.i.g. which is the saturation pressure corresponding to the temperature of the ambient air about the evaporator 11. Meanwhile, the temperature of bulb 60 will increase up to 80° F. and the pressure in the bulb 60 will increase to about 120 p.s.i.g. The compressor 10 can be restarted and the valve parts will revert to their normal operating position once the evaporator pressure drops.

Another minor force that enters into the action of the valve is created by the pressure difference existing across the by-pass port 30. This force is of interest to the valve designer in selecting the strength of the return spring 32.

A modified construction of the expansion valve 13 is shown in FIG. 4. The structure of such valve is exactly the same as that described previously with respect to FIG. 2 except for the variation described below.

It will be noted that the valve includes the valve body 13 having the flow passage 23 extending therethrough, the valve body 13 including a partition 24 in which the fitting 25 is threadedly attached, the fitting 25 including a main valve port 63.

A main valve 64 is located in the refrigerant passage 23 on the outlet side of the main valve port 63, the main valve 64 being adapted to control the flow of refrigerant through the passage by opening or closing the main valve port 63.

Disposed about the main valve 64 is a sleeve or carrier 66 in which the main valve 64 is slidably received. The carrier 66 is provided with a by-pass valve portion 67 that engages the main valve 64 to close by-pass port 65 located therebetween under normal "on" or running-cycle conditions. When the main valve 64 engages the fitting 25 to close the main valve port 63 and the carrier 66 rises sufficiently to disengage the by-pass valve portion 67 from the main valve 64, the by-pass port 65 is open.

A *return* spring 70 located within the carrier 66 engages the main valve 64 and tends to urge the main valve 64 in a direction so that the by-pass valve portion 67 engages the main valve 64 to close the by-pass port 65.

Another compression spring 71 is disposed within the carrier 66, the spring 71 having one end engaging the carrier 66 and having the opposite end engaging a bearing plate 42 on bottom cap 40 as indicated by the embodiment of FIG. 2. The spring 71 tends to urge the carrier 66 and the main valve 64 carried therein as a unit in a direction so that the main valve 64 closes the main valve port 63. Moreover, the spring 71 tends to urge the carrier 66 in a direction with respect to the main valve 64 so as to tend to open the by-pass port 65.

The operation of the valve modification illustrated in FIG. 4 is substantially the same in general principle to that previously described.

In this embodiment, the operation is as follows, starting with the system inoperative and the valve parts in the position shown in FIG. [5] *4*. With the system inoperative, the pressure in the evaporator 11 is at saturation corresponding to the ambient temperature. At a typical temeprature of 80° F., the pressure with Refrigerant-22 would be 145 p.s.i.g. This pressure is exerted on the underside of valve diaphragm 47 in FIG. 2. The pressure in the valve bulb 60 which is gas charged is at 120 p.s.i.g. at 80° F. (by design) and is the pressure exerted on the top of the diaphragm 47. The force exerted by the spring 71 is approximately 22 pounds and is sufficient to overcome the force of the smaller spring 70 which is approximately 5 pounds.

Since the pressure on the underside of the diaphragm 47 is higher than that on the top, the diaphragm 47 is in the extreme top position. The motion of the diaphragm 47 is transmitted to the carrier 66 by the push rods 52. Therefore, with the diaphragm 47 in the top position, the spring 71 has forced the carrier 66 up so that the main valve 64 has closed the main valve port 63. Also, in this position of the diaphragm 47, the carrier 66 has moved about 0.020 inch past the point at which the main valve 64 has contacted the fitting 25 to close the main valve port 63. In this relative position, the by-pass or equalization port 65 between the main valve 64 and the carrier [60] *66* is opened. Thus the refrigerant is free to flow through the main valve 64 and the carrier [60] *66* into the evaporator 11.

When the compressor 10 is started, the pressure in the evaporator 11 drops below the bulb pressure and the action of the diaphragm 47 pushes the carrier [60] *66* down [, thereby closing the by-pass port 65 and opening] *to a position so that the by-pass port 65 is closed by the by-pass valve portion 67 under the loading of return spring 70. Further downward movement of the carrier 66 opens* the main port 63. The valve 13 is then in the normal operating position.

As soon as the compressor 10 stops, the evaporator pressure rises faster than the pressure in the bulb 60. Under these conditions, the diaphragm 47 moves up, causing the main valve port 63 to close and causing the by-pass port 65 to open. When the by-pass port 65 is opened, a rapid equalization of pressures on the high and low sides of the valve 13 will occur.

*The provision of the small return spring 32 in FIG. 2 and the small return spring 70 in FIG. 4 produces enough additional closing force at start up to cause the by-pass ports 30 and 65 respectively to close soon after the system is started. In order to allow the secondary or by-pass port to be large enough to provide rapid pressure equalization, the small return spring which tends to close the by-pass port is a necessary part of this invention.*

Although the invention has been described by making detailed reference to a preferred embodiment and a modification thereof, such detail is to be understood in an instructive rather than in any restrictive sense, many variants being possible within the scope of the claims hereunto appended.

We claim as our invention:

1. In a refrigeration system having a compressor, condenser, and evaporator operatively interconnected, an expansion valve connected in the line between the condenser and the evaporator, the expansion valve comprising:

(a) a valve body having an inlet connected to the line leading from the condenser, and an outlet connected to the line leading to the evaporator, the valve body having a passage connecting the valve inlet and outlet, (b) a main valve means movably mounted for controlling flow through the passage, (c) a spring means tending to urge the main valve means toward a closed position, (d) a flexible motor element carried by the body, (e) means subjecting one side of the motor element to a pressure that is a function of the temperature of the refrigerant at the evaporator outlet, (f) means subjecting the other side of the motor element to evaporator pressure, (g) means connecting the motor element and the main valve, (h) a by-pass passage connecting the valve inlet and outlet, and (i) a by-pass valve means actuated by the main valve means to control flow through the by-pass passage.

2. In a refrigeration system having a compressor, condenser, and evaporator operatively interconnected, an expansion valve connected in the line between the condenser and evaporator, the expansion valve comprising:

(a) a valve body having an inlet connected to the line leading from the condenser, and an outlet connected to the line leading to the evaporator, (b) the valve body having a passage connecting the valve inlet and outlet, the passage including a main valve port and a by-pass port, (c) a flexible motor element carried by the body, (d) means subjecting one side of the motor element to a pressure that is a function of the temperature of the refrigerant at the evaporator outlet, (e) means subjecting the other side of the motor element to evaporator pressure, (f) a main valve means movably mounted for controlling flow through the main valve port, (g) means connecting the motor element and the main valve, (h) a by-pass valve means regulating flow through the by-pass port, and (i) the main valve means and by-pass valve means moving together to cause the by-pass valve means to close the by-pass port and the main valve means subsequently opening the main valve port upon reduction of the evaporator pressure when the compressor is started, the main valve means closing the main valve port and subsequently moving together with the by-pass valve means to cause the by-pass valve means to open the by-pass port upon increase of evaporator pressure when the compressor is stopped.

3. The combination and arrangement of elements as recited in claim 2, in which:

(j) the main valve port is provided in the by-pass valve means, (k) the main valve port being opened and closed by the main valve means, and (l) the by-pass valve means being actuated by the main valve means to open and close the by-pass port.

4. In a refrigeration system having a compressor, condenser, and evaporator operatively interconnected, and an expansion valve connected in the line between the condenser and the evaporator, the expansion valve comprising:

(a) a valve body having an inlet connected to the line leading from the condenser, and an outlet connected to the line leading to the evaporator, (b) the valve body having a passage connecting the valve inlet and outlet, the passage including an internal aperture, (c) a flexible motor element carried by the body, (d) means subjecting one side of the motor element to a pressure that is a function of the temperature of the refrigerant at the evaporator outlet, (e) means subjecting the other side of the motor element to evaporator pressure, (f) a by-pass valve means extending through the aperture and providing a peripheral by-pass port about the by-pass valve means, the by-pass valve means regulating flow through the by-pass port, the by-pass valve means being provided with a main valve port, (g) a main valve means movably mounted for controlling flow through the main valve port, (h) the main valve means and by-pass valve means moving together to cause the by-pass valve means to close the by-pass port and the main valve means subsequently moving to open the main valve port upon reduction of evaporator pressure when the compressor is started, and the main valve means moving to close the main valve port and subsequently moving the by-pass valve means to open the by-pass port upon increase of evaporator pressure when the compressor is stopped.

5. The combination and arrangement of elements as recited above in claim 4, in which:

(i) the by-pass valve means is provided with a bleed hole interconnecting the main valve port and by-pass port to assure a more rapid rise in evaporator pressure when the compressor stops.

6. The combination and arrangement of elements as recited above in claim 4, in which:

(i) the by-pass valve means includes a head located on the high side of the passage aperture for opening or closing the by-pass port, and (j) the main valve means is located on the low side of the aperture for opening and closing the main valve port through the by-pass valve means, (k) the direction of flow tending to close the by-pass valve means and to open the main valve means.

7. The combination and arrangement of elements as recited above in claim 6, in which:

(l) a second spring means acts in opposition to the first said spring means and tends to urge the by-pass valve means toward a closed position.

8. In a refrigeration system having a compressor, condenser, and evaporator operatively interconnected, and an expansion valve connected in the line between the condenser and evaporator, the expansion valve comprising:

(a) a valve body having an inlet connected to the line leading to the condenser, and an outlet connected to the line leading to the evaporator, (b) the valve body having a passage connecting the valve inlet and outlet, the passage including an internal aperture, (c) a flexible motor element carried by the body, (d) a sensing bulb located at the evaporator outlet and connected to the flexible motor element to subject one side of the motor element to a pressure that is a function of the temperature at the evaporator outlet, (e) means subjecting the other side of the motor element to the evaporator pressure, (f) a by-pass valve means extending through the aperture and providing a peripheral by-pass port about the by-pass valve means, the by-pass valve means including a head located on the high side of the aperture for opening or closing the by-pass port, the by-pass valve means being tubular to provide a main valve port, (g) a main valve means movably mounted and located on the low side of the aperture for opening or closing the main valve port in the by-pass valve means, the direction of flow tending to close the by-pass valve means and to open the main valve means, (h) a first spring means tending to urge the main valve means toward a closed position, (i) a second spring means acting in opposition to the first spring means and tending to urge the by-pass valve means toward a closed position, (j) means connecting the motor element and the main valve means, and (k) means in the sensing bulb providing a thermal lag so that the pressure exerted on one side of the motor element which is a function of the refrigerant temperature at the evaporator outlet decreases at a slower rate than the decrease of evaporator pressure on the other side of the motor element upon starting the compressor, and increases at a slower rate than the increase of evaporator pressure upon stopping the compressor.

9. An expansion valve comprising:

(a) a valve body having an inlet and an outlet interconnected by a passage, the passage including an internal aperture, (b) a flexible motor element carried by the body, (c) means subjecting one side of the motor element to a pressure that is a function of the temperature of the refrigerant on the low side of the aperture, (d) means subjecting the other side of the motor element to pressure on the low side of the aperture, (e) a by-pass valve means extending through the aperture and providing a by-pass port peripherally about the by-pass valve means, the by-pass valve means regulating flow through the by-pass port, the by-pass valve means being provided with a main valve port, (f) a main valve means movably mounted for controlling flow through the main valve port, (g) the main valve means and the by-pass valve means moving together to cause the by-pass valve means to close the by-pass port and the main valve means subquently moving to open the main valve port upon reduction of pressure on the low side, and the main valve means moving to close the main valve port and subsequently moving together with the by-pass valve means to cause the by-pass valve means to open the by-pass port increase of pressure on the low side.

(h) a spring means tending to urge the main valve means toward a closed position, and (i) means connecting the motor element and the main valve means.

10. An expansion valve as defined above in claim 9, in which:

(j) the by-pass valve means includes a head located on the high side of the aperture for opening or closing the by-pass port, (k) the main valve means is located on the low side of the aperture for opening or closing the main valve port through the by-pass valve means, the direction of flow tending to close the by-pass valve means and to open the main valve means, and (l) a second spring means acts in opposition to the first said spring means and tends to urge the by-pass valve means toward a closed position.

*11. In a refrigeration system having a compressor, condenser, and evaporator operatively interconnected, an expansion valve connected in the line between the condenser and the evaporator, the expansion valve comprising:*

*(a) a valve body having an inlet connected to the line leading from the condenser, and an outlet connected to the line leading to the evaporator, the valve body having a passage connecting the valve inlet and outlet,*

*(b) a main valve means movably mounted for controlling flow through the passage,*

*(c) a spring means tending to urge the main valve means toward a closed position,*

*(d) a flexible motor element means carried by the body and actuating the main valve means,*

*(e) means subjecting one side of the motor element means to a pressure that is a function of the temperature of the refrigerant at the evaporator outlet,*

*(f) means subjecting the other side of the motor element means to evaporator pressure,*

*(g) a by-pass passage connecting the valve inlet and outlet,*

*(h) a by-pass valve means movably mounted for controlling flow through the by-pass passage, and*

*(i) a second spring means acting in opposition to the first said spring means and tending to urge the by-pass valve means toward a closed position.*

*12. A refrigeration system as defined in claim 11, in which:*

*(j) the second spring means closing the by-pass passage when the system starts even though the by-pass passage may have sufficient area to feed the evaporator and satisfy the existing load.*

References Cited by the Examiner

The following references, cited by the Examiner, are of record in the patented file of this patent or the original patent.

UNITED STATES PATENTS

| | | | |
|---|---|---|---|
| 971,788 | 9/1910 | Pollard | 62—214 |
| 2,669,849 | 2/1954 | Lange | 62—225 |
| 2,709,340 | 5/1955 | Webber | 62—225 |

MEYER PERLIN, *Primary Examiner.*